United States Patent [19]
Albouy et al.

[11] Patent Number: 5,050,239
[45] Date of Patent: Sep. 17, 1991

[54] LASER POWER SUPPLY AND CONTROL DEVICE FOR A FIBER OPTIC LINK BETWEEN A SUBSCRIBER AND A TELECOMMUNICATIONS CENTRAL OFFICE

[75] Inventors: Pierre Albouy, Lannion; Gérard Chartie, Trebeurden, both of France

[73] Assignee: Alcatel Cit, Paris, France

[21] Appl. No.: 496,710

[22] Filed: Mar. 21, 1990

[30] Foreign Application Priority Data

Mar. 22, 1989 [FR] France ............................ 89 03758

[51] Int. Cl.⁵ .......................................... H04B 10/00
[52] U.S. Cl. ................................... 359/180; 359/161; 359/115
[58] Field of Search ............... 455/611, 618, 612, 617, 455/606, 607, 613, 609, 610; 370/4, 1, 2; 372/38

[56] References Cited

U.S. PATENT DOCUMENTS

| | | | |
|---|---|---|---|
| 4,009,385 | 2/1977 | Sell | 455/611 |
| 4,477,895 | 10/1984 | Casper et al. | |
| 4,553,268 | 11/1985 | Tilly | 455/611 |
| 4,757,193 | 7/1988 | Kollanyi | 455/613 |
| 4,799,224 | 1/1989 | Bottacchi et al. | 372/38 |
| 4,864,649 | 9/1989 | Tajima et al. | 455/611 |

FOREIGN PATENT DOCUMENTS 2902789 8/1979 Fed. Rep. of Germany.
3508034 9/1986 Fed. Rep. of Germany.

OTHER PUBLICATIONS

Ecoc 83-9th European Conference on Optical Communications, Geneva, Oct. 23-26, 1983, pp. 267-270, Elsevier Science Publishers B. V. (North Holland), Amsterdam, NL; T. Hamanaka et al.:"560M6/S Single-Mode Fiber Transmission Experiment".

Primary Examiner—Reinhard J. Eisenzopf
Assistant Examiner—Kinfe-Michael Negash
Attorney, Agent, or Firm—Sughrue, Mion, Zinn, Macpeak & Seas

[57] ABSTRACT

A laser power supply and control device for a fiber optic link between a subscriber and a telecommunications central office provides selection of one of two data sources and varies the laser current. The device includes a current generator controlled by an activation signal and delivers a laser current to a laser that can be varied. A selector circuit is connected to the two data sources. An output modulator has an input connected to the current generator which delivers the laser current thereto and to the selector circuit which delivers the transmit data. Its output is connected to the laser to which it delivers the laser current modulated by the transmit data. In the absence of data to transmit the value of the activation signal, the current generator is disabled so that the laser is not energized.

8 Claims, 5 Drawing Sheets

LASER POWER SUPPLY AND CONTROL DEVICE FOR A FIBER OPTIC LINK BETWEEN A SUBSCRIBER AND A TELECOMMUNICATIONS CENTRAL OFFICE

BACKGROUND OF THE INVENTION

1. Field of the invention

The invention concerns the supply of power to and the control of a laser for a fiber optic link between a subscriber and a telecommunications central office, the data to be transmitted having a high data signalling rate, of several tens or possibly hundreds of Mbit/s, and modulating the power supply current to a laser diode emitting a light beam transmitted by optical fiber. Hereinafter the laser diode will be referred to as a laser.

2. Description of the Prior art

Existing laser power supply devices are implemented in discrete components and integrated circuits.

Discrete component devices have the following disadvantages:

their poor accuracy due to the large variations in discrete component parameters with temperature, these variations being difficult to compensate, they take up more room on printed circuit boards, large-scale manufacture is more costly using them, implementation problems: the high data signalling rates require short connections and therefore the use of hybrid components, further increasing costs.

Like discrete component devices, integrated circuit devices which already exist do not allow the laser power supply current to be adjusted or cut off if there is no data to be transmitted in order to increase the service life, or the use of two switchable data sources. In standard telecommunication practice a fiber optic link is connected at each end to a terminal module comprising a receive circuit and a transmit circuit each connected to an optical fiber if the link comprises a transmit fiber and a receive fiber or to a single optical fiber if the link comprises only one fiber for both transmission directions. To carry out from the telecommunication central office tests on the link connecting the central office and a terminal module, a test device located at the central office sends test signals to the terminal module and should receive in return the signals transmitted, so that it can check them. This requires loopback between the receive circuit and the transmit circuit in the terminal module. The laser power supply device is part of the transmit circuit and must therefore in this case receive the test signals from the receive circuit in order to retransmit them, &he receive circuit then constituting a data source, so to speak. What is more, in normal operation the power supply device receives data to be transmitted direct from a direct source connected to the terminal module. It must therefore be possible for the laser power supply device to be connected to one or other of these two sources. Also, loopback may also be used when a subscriber receives data of any kind—video, telephone, computer data, etc—for checking by the subscriber or the station which transmitted the data.

An object of the invention is to alleviate the disadvantages of existing devices, to provide for the use of two switchable data sources and to enable the laser power supply current to be adjusted and cut off.

SUMMARY OF THE INVENTION

The invention consists in a laser power supply and control device for a fiber optic link between a subscriber and a telecommunications central office comprising a current generator adapted to be controlled by an activation signal and to supply a laser current that can be varied by external means, a selector circuit for selecting one of two data sources and an output modulator having an input connected to said current generator and to said selector circuit and an output adapted to be connected to said laser.

The invention will now be described by means of typical embodiments shown in the appended drawings.

DETAILED DESCRIPTION OF THE INVENTION

Figure 1:
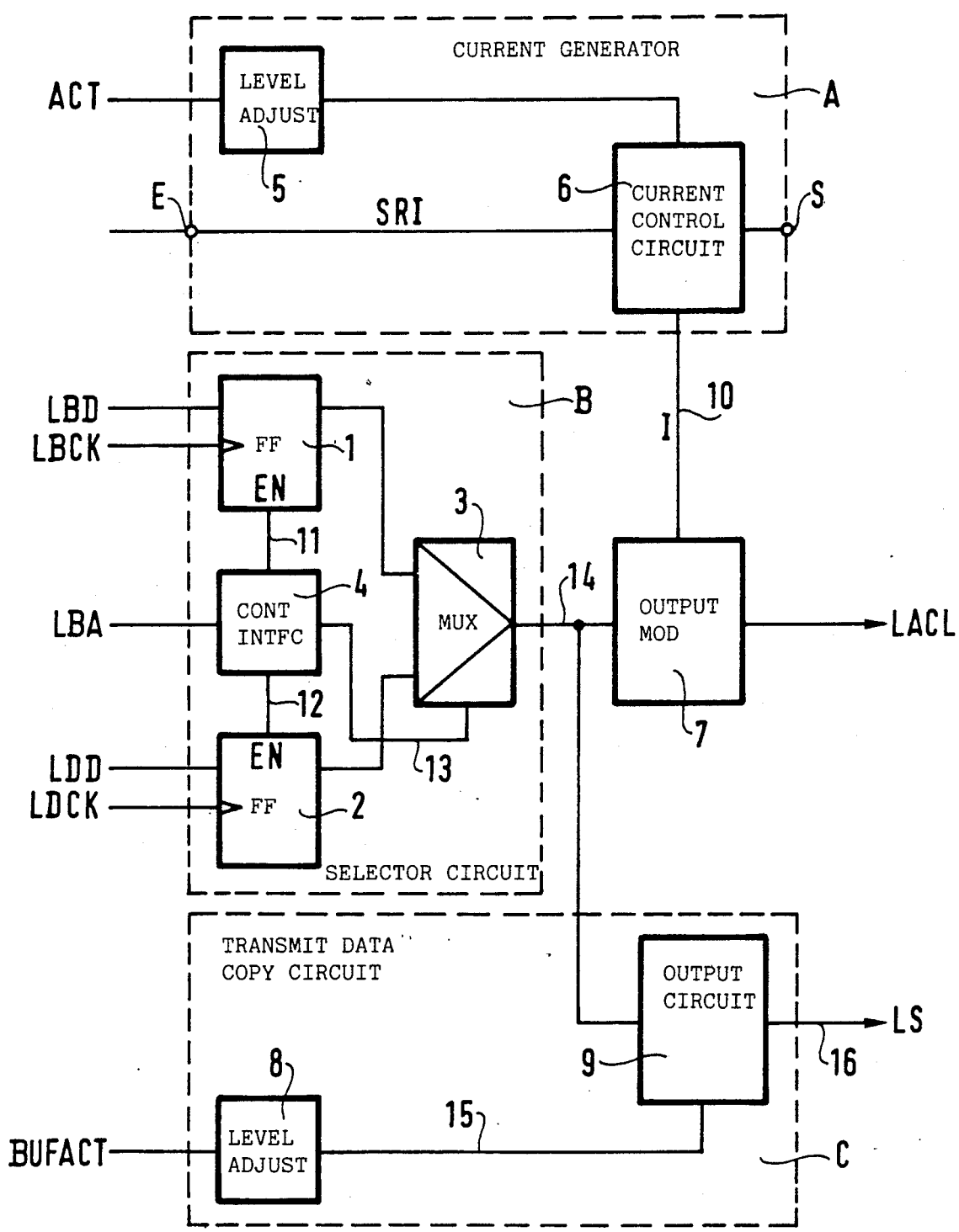
FIG. 1 is a schematic representation of a power supply and control device in accordance with the invention.

FIG. 1 is a schematic representation of the power supply and control device in accordance with the invention; it comprises a current generator A, a selector circuit B, an output modulator 7 and a transmit data copy circuit C, this latter circuit being optional. A power supply device of this kind is provided at each end of a fiber optic link; there is therefore one device at the subscriber premises and one device in the subscriber line circuit at the central office.

The current generator A comprises a current control circuit 6 and a level adjust circuit 5 for activating or deactivating the laser, so that the laser power supply current can be cut off when the subscriber/telecommunications central office link is not active to increase the service life of the laser. The level adjust circuit 5 receives at its input an activation signal ACT and is connected to the current control circuit 6 which is also connected to an input terminal E and receives from this a current control signal SRI; the current control circuit 6 is connected to the output modulator 7 by a line 10 carrying a current I and has an output connected to a measurement output terminal S.

The selector circuit B comprises two D type flip-flops 1 and 2, a multiplexer 3 and a control interface 4. The output of each flip-flop is connected to the multiplexer 3 which has a control input connected to the output of the control interface 4 by a line 13. The flip-flop 1 receives data LBD from a first data source and its clock input receives a clock signal LBCK associated with the data LBD from the first source; the flip-flop 2 receives data LDD from a second data source and its clock input receives a clock signal LDCK associated with the data LDD from the second source. Each flip-flop has an enable input EN connected by a line 11, 12 to an output of the control interface 4 which receives a select signal LBA for selecting the data LBD or LDD from the respective data source. Depending on the select signal LBA, the control interface 4 enables one of the flip-flops 1 or 2 and commands the multiplexer 3 to process the data from the enabled flip-flop.

The output modulator 7 is connected to the output of the multiplexer 3 by a line 14 and delivers a laser power supply signal LACL. The transmit data copy circuit C comprises a level adjust circuit 8 receiving an activation signal BUFACT and an output circuit 9 having an input connected by the line 14 to the output of the multiplexer 3 and an activation input connected to the output of the level adjust circuit 8, said output circuit delivering on a line 16 an output signal LS which is a copy of the transmit data delivered by the multiplexer. The data copied in this way is transmitted to a logic level for subsequent use, for example by a test circuit; the activation signal BUFACT is used to activate or deactivate the output circuit 9 to which it is connected by a line 15.

Figure 2:
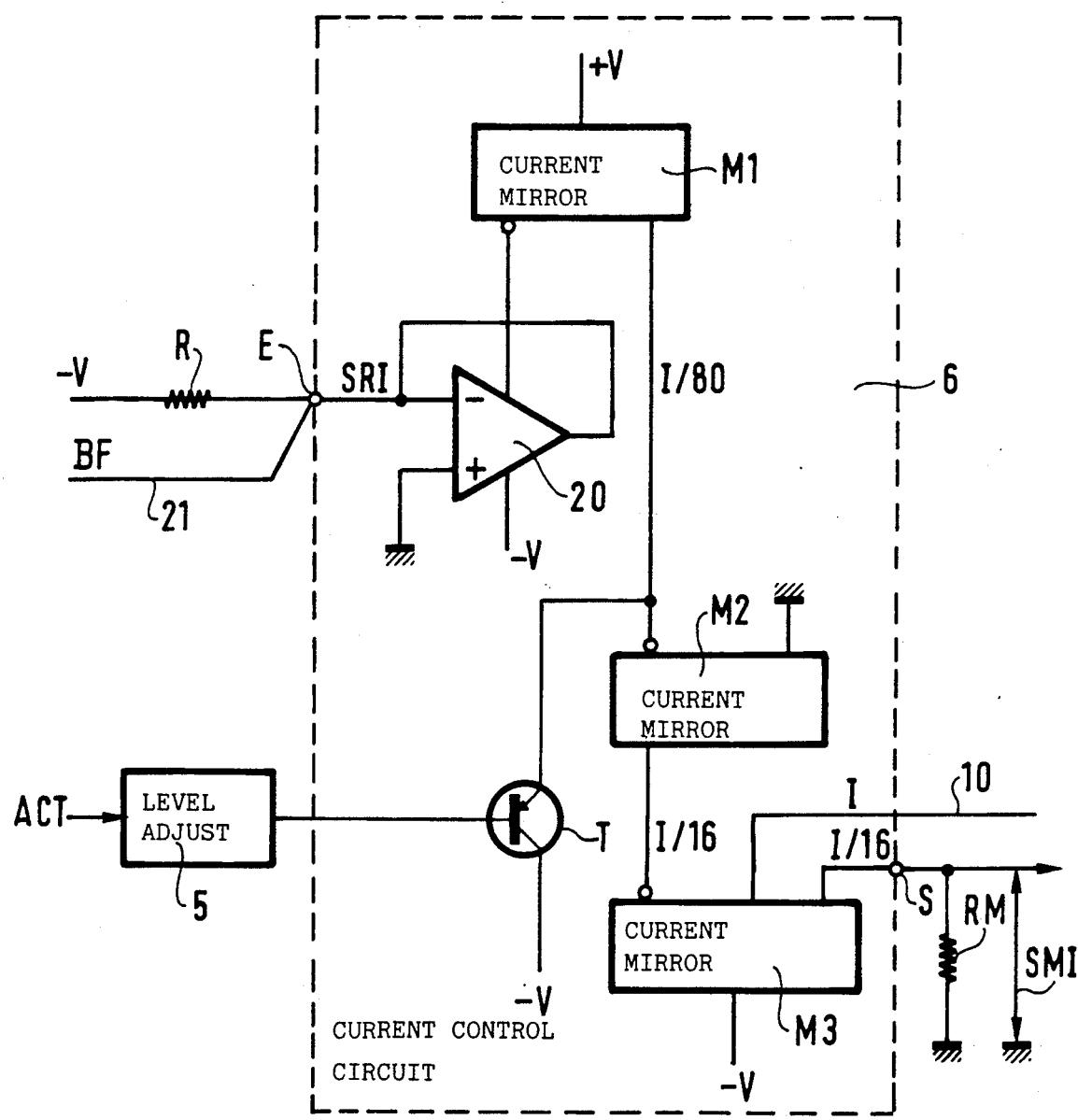
FIG. 2 shows the control circuit of the current generator from FIG. 1.

FIG. 2 shows the current control circuit 6 of the current generator A. The current control circuit comprises three cascaded current mirrors M1, M2, M3, an operational amplifier 20 and a transistor T.

In the current control circuit 6 the amplifier 20 has a negative input connected to the input terminal E, a positive input connected to ground and an output connected to the negative input; the amplifier has one power supply terminal connected to a negative potential $-V$ and another power supply terminal connected to an input of the current mirror M1. The current mirror M1 is connected to a positive potential $+V$ and to an input of the current mirror M2. The input terminal E is connected to the negative potential $-V$ through a resistor R external to the current control circuit and enabling the laser current to be varied, the negative input of the amplifier 20 receiving a DC current.

The input terminal E is also connected to a line 21 carrying an AC signal BF; this AC signal is sent by a calling subscriber equipment and is detected by the called subscriber equipment. The AC signal sent by a calling subscriber equipment before transmitting data is used to activate the circuits at the called subscriber equipment. The alternating current due to the AC signal BF is superimposed on the DC current and modulates it; the current control signal SRI applied to the negative input of the amplifier 20 is therefore either a direct current when transmitting data delivered by the selector circuit B or a direct current modulated by the AC signal BF prior to transmission of data. The current mirror M1 delivers a current I/80 to the current mirror M2, I being the laser power supply current. The base of a bypass transistor T is connected to the output of the level adjust circuit 5 which receives the activation signal ACT; the emitter of the transistor is connected to the input of the current mirror M2 and its collector is connected to the negative potential $-V$. The role of the transistor T is to bypass the current I/80 delivered by the current mirror M1 in the absence of the activation signal ACT, that is to say if the laser is not to be energized. The current mirror M2 has a grounded output; it is also connected to an input of the current mirror M3 to which it delivers a current I/16. The current mirror M3 is connected to the negative potential $-V$ and to the output modulator 7 by the line 10 carrying a direct current I; the current mirror M3 has an output grounded through a measuring resistor RM with a value of 160 ohms, for example, external to the control circuit and carrying a current I/16; the measuring signal SMI is the voltage across the measuring resistor RM, this voltage being equal to $160 \times I/16 = 10 \times I$ volts; it is therefore a simple matter to vary the laser current by reading this voltage which gives the value of the current multiplied by ten.

Figure 3:
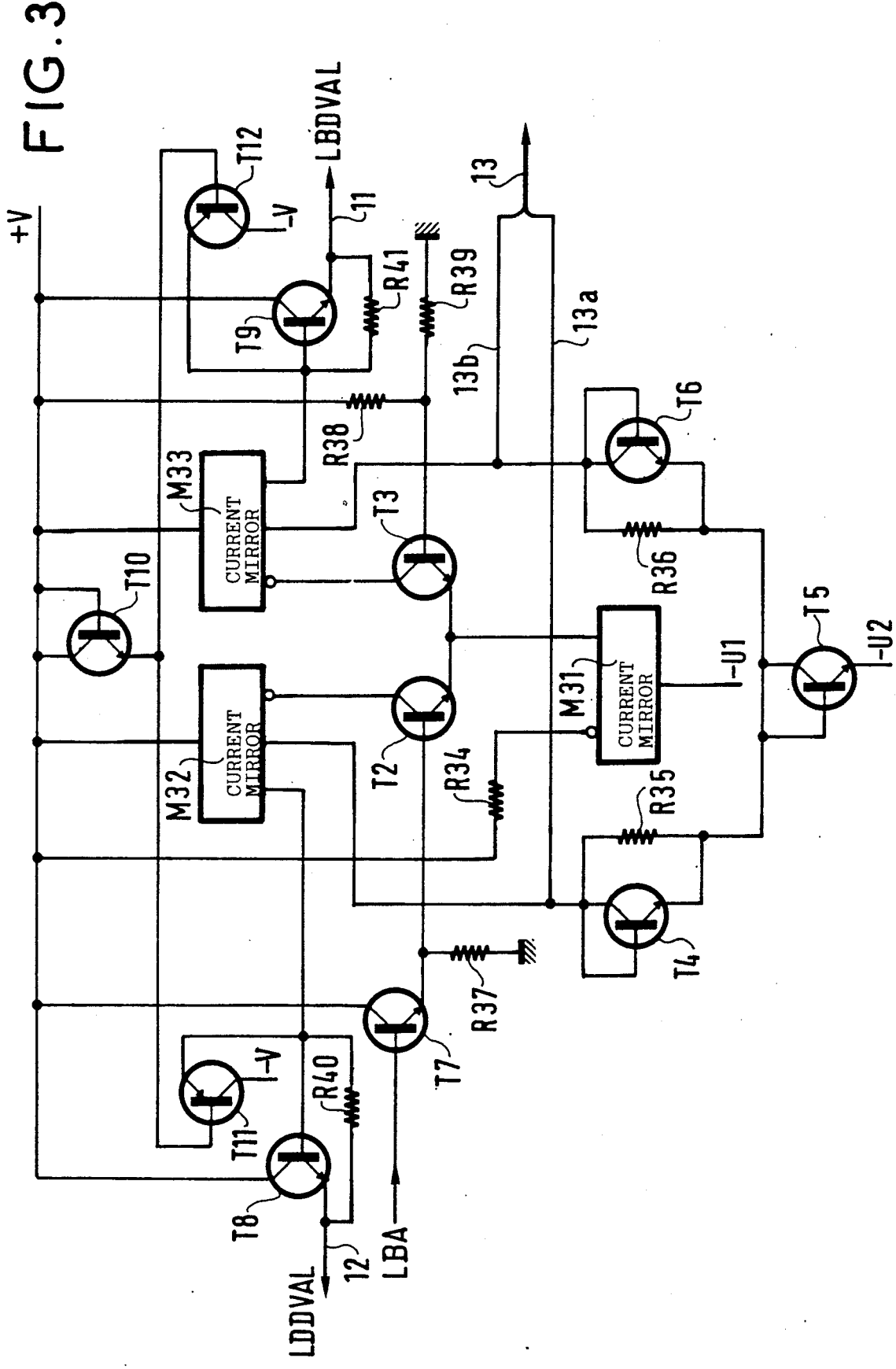
FIG. 3 shows the control interface of the selector circuit from FIG. 1.

FIG. 3 is a schematic representation of the control interface 4 of the selector circuit B from FIG. 1.

A current mirror M31 connected to a first negative voltage $-U1$ and to the positive voltage $+V$ is connected by a differential circuit comprising two transistors T2 and T3 to two current mirrors M32 and M33, the transistor T2 being connected to the current mirror M32 and the transistor T3 being connected to the current mirror M33. Each of the current mirrors M32, M33 is connected to the positive voltage $+V$. The transistor T7 receives at its base the select signal LBA and has its collector connected to the positive voltage $+V$ and its emitter connected to the base of the transistor T2 and also to ground through a resistor R37; the transistor T3 has its base connected to the positive voltage $+V$ through a resistor R38 and also to ground through a resistor R39. The transistor T7 is controlled by the select signal LBA and controls the differential circuit constituted by the transistors T2 and T3 so as to switch to one or other of the current mirrors M32, M33 the current delivered by the current mirror M31. Each current mirror M32, M33 has a first output connected direct to the multiplexer 3 from FIG. 1 by a respective line 13a, 13b, these lines constituting the line 13 in FIG. 1; the multiplexer 3 is of the differential type and has two control inputs each connected to a respective line 13a, 13b. The first output of the current mirror M32 is also connected by a transistor T4 to a transistor T5 in turn connected by its emitter to a second negative voltage $-U2$; the first output of the current mirror M33 is also connected by a transistor T6 to the transistor T5; the transistors T4, T5 and T6 each have their base connected to their collector and the transistors T4 and T6 each have their collector connected to their emitter through a respective resistor R35, R36. The transistors T5 and T4 or T6 bias the lines 13a and 13b which convey control signals to the multiplexer 3.

Each current mirror M32 and M33 has a second output connected to the base of a respective transistor T8, T9 the collector of which is connected to the positive voltage $+V$; the emitter of the transistor T8 is connected by the line 12 to the enable input EN of the flip-flop 2 to which it delivers an enabling signal LDDVAL and the emitter of the transistor T9 is connected by the line 11 to the enable input EN of flip-flop 1 to which it delivers an enabling signal LBDVAL.

The emitter and the base of the transistors T8 and T9 are interconnected by respective resistors R40, R41.

The second output of the current mirror M32 is also connected by transistor T11 to a transistor T10 in turn connected to the positive voltage $+V$; the second output of the current mirror M33 is also connected by a transistor T12 to the transistor T10; the connector of each of the transistors T11 and T12 is connected to a negative potential $-V$ and the collector and the base of transistor T10 are connected to the positive potential $+V$. The second outputs of the current mirrors M32 and M33 enable one only of the flip-flops 1 or 2 through the intermediary of the transistors T8 and T9, according to whether the current delivered by the current mirror M31 is routed to the current mirror M32 or M33; the transistors T11 and T10 or T12 and T10, as appropriate, constitute a self-saturating device limiting the amplitude of the enabling signal delivered by the transistor T8 or T9.

Figure 4:
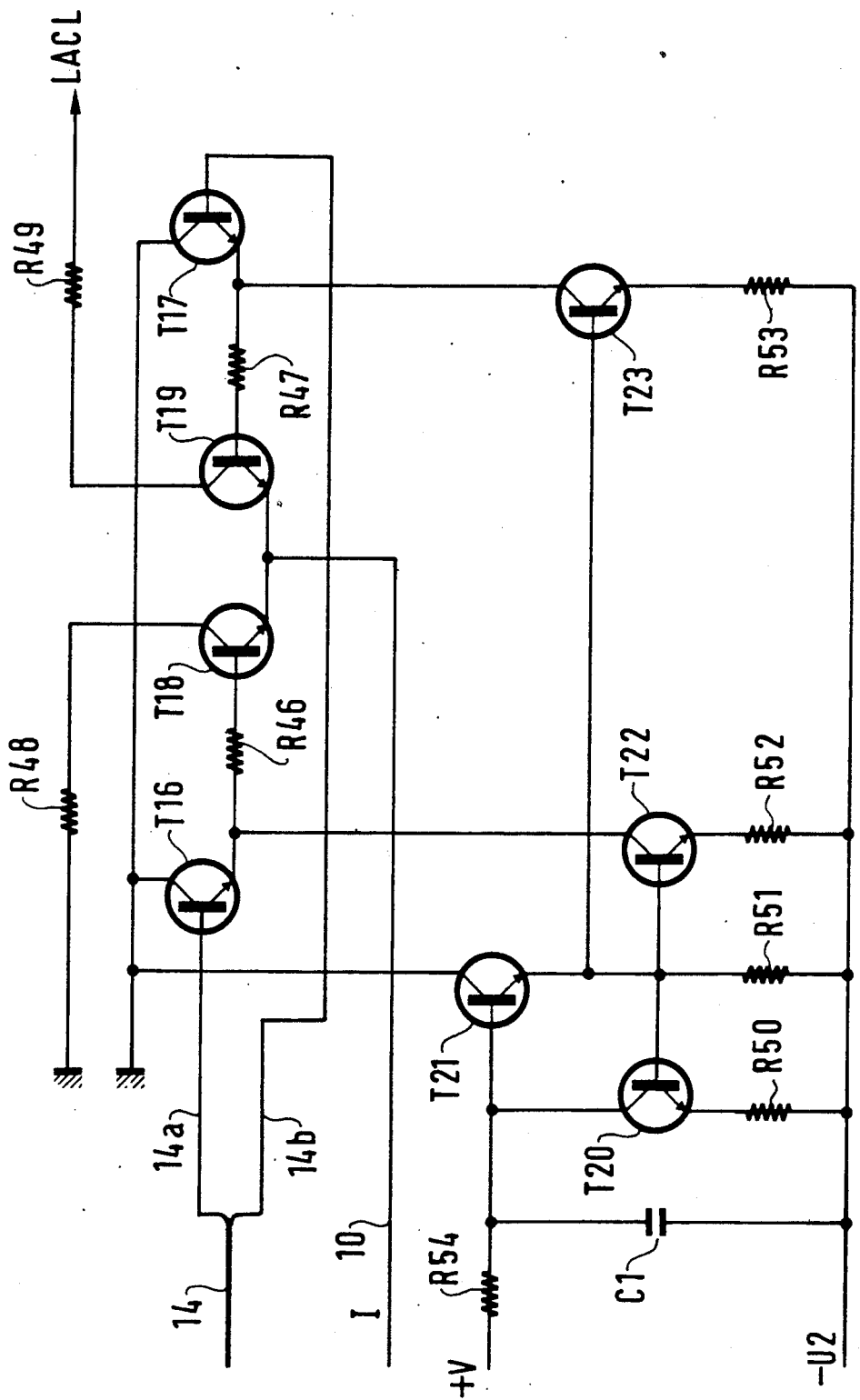
FIG. 4 shows the output modulator from FIG. 1.

FIG. 4 shows the output modulator 7 from FIG. 1. The output modulator comprises eight transistors T16 through T23. The base of each transistor T16 and T17 is connected to a respective line 14a, 14b, these two lines constituting the line 14 between the differential output of the multiplexer 3 and the output modulator in FIG. 1. The collector of the transistor T16 is grounded and its emitter is connected by a resistor R46 to the base of a transistor T18 the collector of which is grounded by a resistor R48. The collector of the transistor T17 is grounded and its emitter is connected by a resistor R47 to the base of a transistor T19 the collector of which is connected to a resistor R49 and delivers the laser power supply signal LACL. The emitters of the transistors T18 and T19 are connected to the line 10 connecting the output modulator 7 to the current control circuit 6, the line 10 carrying the laser current I. The emitter of the transistor T16 is also connected to the collector of a transistor T22 the emitter of which is connected to the second negative voltage −U2 by a resistor R52. The emitter of the transistor T17 is also connected to the collector of a transistor T23 the emitter of which is connected to the second negative voltage −U2 by a resistor R53. The collector of a transistor T21 is grounded and its emitter is connected to the second negative voltage −U2 by a resistor R51, to the base of the transistors T22 and T23 and to the base of a transistor T20 the emitter of which is connected to the second negative voltage −U2 by a resistor R50. The base of the transistor T21 and the collector of the transistor T20 are connected to the positive potential +V by a resistor R54 and also to the second negative voltage −U2 by a capacitor C1. The data to be transmitted, delivered by the multiplexer 3 and conveyed by the line 14, on/off modulates the laser current I by means of the transistors T16 through T19. The transistors T22 and T23 in series with the respective transistors T16 and T17 are fixed biased by the transistor T21, the transistor T20 stabilizing the voltage at the base of the transistor T21 in the event of variation in the positive potential +V; the capacitor C1 filters out very short-term variations (interference) on the positive potential +V; each transistor T22, T23 and the associated resistor R52, R53 constitutes a constant current source.

Figure 5:
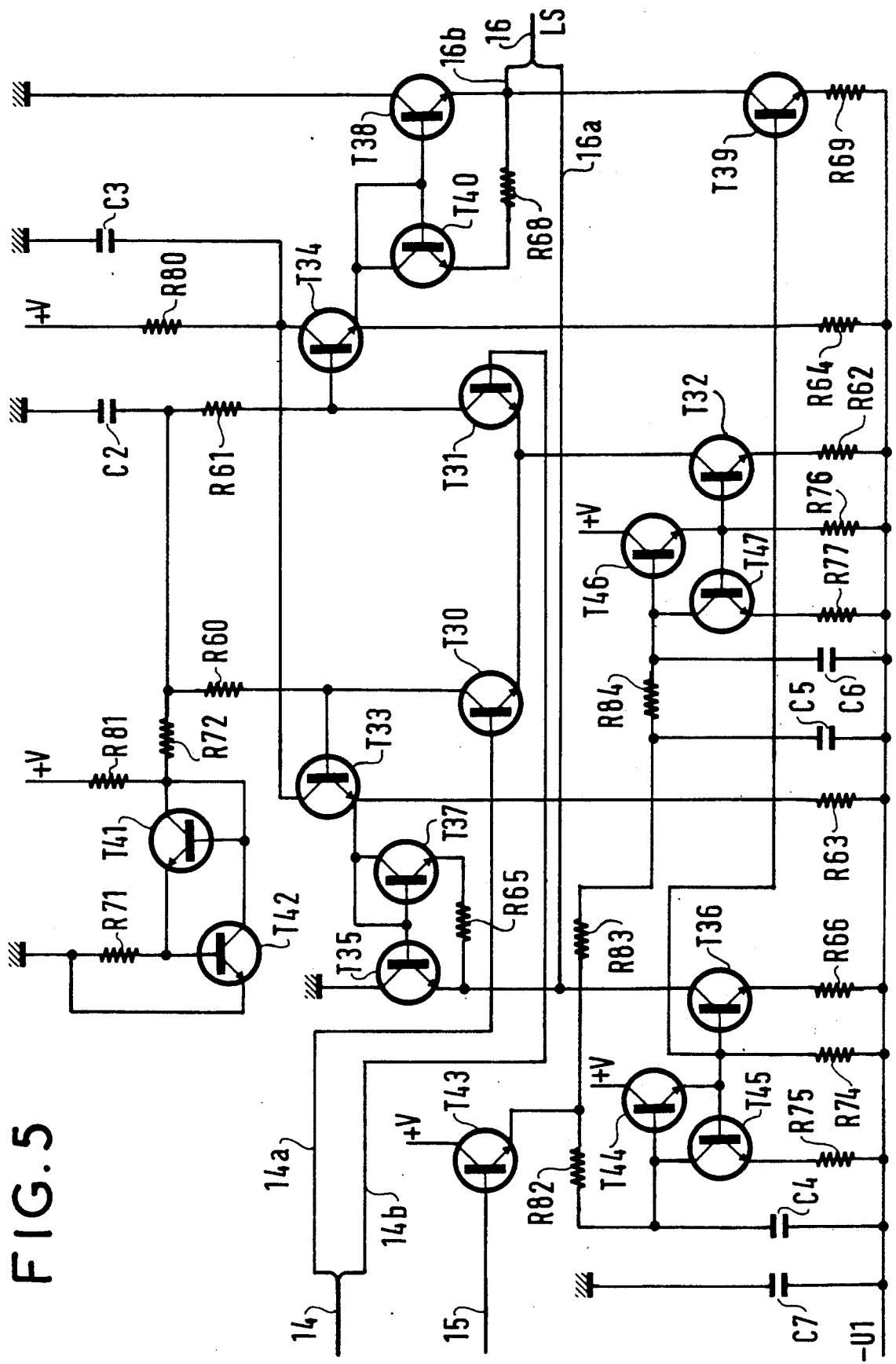
FIG. 5 shows the output circuit of the transmit data copy circuit from FIG. 1.

FIG. 5 shows the output circuit 9 of the transmit data copy circuit C from FIG. 1.

Two transistors T30 and T31 of a differential stage have their bases connected to a respective line 14a, 14b, these two lines constituting the line 14 connecting the output circuit 9 to the differential output of the multiplexer 3. The collector of each transistor T30, T31 is connected by a respective resistor R60, R61 to a capacitor C2 which is grounded. The emitters of the transistors T30 and T31 are connected to the collector of a transistor T32 the emitter of which is connected by a resistor R62 to the first negative voltage −U1. The base of a transistor T33 is connected to the collector of the transistor T30 and its emitter is connected by a resistor R63 to the first negative voltage −U1. The base of a transistor T34 is connected to the collector of the transistor T31 and its emitter is connected by a resistor R64 to the first negative voltage −U1.

The collectors of the transistors T33 and T34 are connected together and grounded through a capacitor C3; they are connected to the positive potential +V through a resistor R80. The collector of a transistor T35 is grounded and its emitter is connected to the collector of a transistor T36 the emitter of which is connected through a resistor R66 to the first negative voltage −U1 and also to the emitter of a transistor T37 through a resistor R65; the collector of the transistor T37 is connected to the emitter of the transistor T33 and its base is connected to its collector and also to the base of the transistor T35. The collector of a transistor T38 is grounded and its emitter is connected to the collector of a transistor T39 the emitter of which is connected by a resistor R69 to the first negative voltage −U1 and also to the emitter of a transistor T40 through a resistor R68; the collector of the transistor T40 is connected to the emitter of the transistor T34 and its base is connected to its collector and also to the base of the transistor T38.

The emitter of the transistor T35 is connected to a line 16a and the emitter of the transistor T38 is connected to a line 16b, the two lines 16a and 16b constituting the line 16 in FIG. 1 by which the output circuit 9 delivers the output signals LS which are a copy of the data signals delivered by the multiplexer 3 on the line 14.

The base of a transistor T41 is connected to its collector, to the collector of a transistor T42, to the positive potential +V through a resistor R81 and to a point common to the capacitor C2 and to the resistors R60 and R61 through a resistor R72; the emitter of the transistor T41 is connected to the base of the transistor T42 and grounded through a resistor R71; the emitter of the transistor T42 is grounded.

The collector of a transistor T43 is connected to the positive potential +V, its base is connected to the line 15 over which it receives from the level adjust circuit 8 an activation signal and its emitter is connected to the base of a transistor T44 through a resistor R82 and also to the base of a transistor T46 through two resistors in series R83 and R84. The collector of the transistor T44 is connected to the positive potential +V and its base is also connected to the first negative voltage −U1 through a capacitor C4 and also to the collector of a transistor T45 the emitter of which is connected through a resistor R75 to the first negative voltage −U1; the emitter of the transistor T44 is connected to the first negative voltage −U1 through a resistor R74 and to the base of each of the transistors T45, T36 and T39. A point common to the resistors R83 and R84 is connected by a capacitor C5 to the first negative voltage −U1. The collector of the transistor T46 is connected to the positive potential +V and its base is connected to the first negative voltage −U1 through a capacitor C6 and also to the collector of a transistor T47 the emitter of which is connected by a resistor R77 to the first negative voltage −U1; the emitter of the transistor T41 is connected to the base of each of the transistors T47 and T42 and to the first negative voltage −U1 through a resistor R76.

A capacitor C7 is connected between ground and the first negative voltage −U1. The transistors T37 and T40 and T41 and equivalent to diodes, their base being connected to their collector.

The output circuit 9 operates at speeds of several hundred Mbit/s, 600 Mbit/s for example, and delivers signals with logic levels compatible with ECL type logic circuits; it can be disabled by the signal delivered by the level adjust circuit 8 on the line 15. The high speed requirement rules out the use in the output circuit of the usual form of temperature compensation for known ECL output stages, i.e. two diodes connected head-to-tail associated with a resistor. Also, the output circuit must consume as little power as possible, which requirement is incompatible with the conventional ECL structure.

In the FIG. 5 circuit the output transistors T35 and T38 are not controlled through a low-value collector resistor but by a low-current differential stage comprising transistors T30 and T31 loaded by higher value collector resistors R60, R61 followed by an adapter stage constituted by transistors T33, T34.

This introduces an additional offset of one base/emitter voltage and increased oscillation at the output because of the Darlington structure. To compensate the additional offset, an offset of one base/emitter voltage above the ground level is obtained by means of the transistors T41 and T42, which also provide temperature compensation for the transistors T34, T38 and T33, T35, and a resistor R72 providing a voltage offset in the order of 800 mV, being associated with the current source constituted by the transistors T32, T46 and T47. The resistor R72 and the transistors T41 and T42 associated with the resistors R81 and R71 constitute a compensation circuit for compensating the above-mentioned offset and for providing temperature compensation for the output transistors T35 and T38 and the transistors T33 and T34 of the adapter stage.

The oscillation problem is solved by adding the diodes T40 and T37 (transistors configured as diodes) which limit the gain of the output transistors T38 and T35 while pushing the dominant pole far away from the pole of the transistors T33, T36; in this way a structure is obtained which is virtually of the first order. Finally, instead of the conventional use of resistors in the emitter circuit of the output transistors T35 and T38, the output circuit of the invention uses current sources (transistors T44, T46 and T36, T39) which makes it possible to reduce the current in the output transistors T35 and T38 and to cut off the current from said current sources, which deactivates the output circuit, said current being cut off by means of the transistor T43 controlled by the level adjust circuit 8 via the line 15.

There is claimed:

1. Laser power supply and control device for a laser of a fiber optic link between a subscriber and a telecommunications central office, said device comprising:
   a current generator for supplying a laser current,
   means responsive to an activation signal for activating and deactivating said current generator,
   external means for varying the level of said laser current,
   a selector circuit selecting one of two data sources and an output modulator having an input connected to said current generator and to said selector circuit, and an output adapted to be connected to said laser, and said output modulator including means for modulating said current according to data supplied by a selected one of said data sources.

2. Device according to claim 1 wherein said current generator comprises a level adjust circuit receiving said activation signal and a current control circuit having an input connected to said level adjust circuit and an output connected to said output modulator, said current control circuit comprises cascaded first, second and third current mirrors, an amplifier having an input adapted to be connected to said external means for varying the laser current which delivers a direct current, said amplifier being supplied by said first current mirror, said first current mirror has an input connected to said second current mirror and to a bypass transistor connected to an output of said level adjust circuit and which is adapted to be turned on in the absence of said activation signal, said first current mirror delivering a low direct current applied to said second current mirror when said bypass transistor is turned off, and said third current mirror has an output connected to said output modulator to which it delivers a direct current laser current proportional to said low direct current.

3. Device according to claim 2 wherein said third current mirror has another output adapted to be connected to an external measuring resistor to which it delivers a measuring current equal to a fraction of the laser current which is varied by said external means to obtain across said measuring resistor a voltage whose value depends on the laser to which said output modulator is connected.

4. Device according to claim 2 wherein the input of alternating current signal which modulates the direct current delivered by the external means for varying the current, said alternating current signal being sent by the laser to activate a subscriber equipment before sending data.

5. Device according to claim 1 wherein said selector circuit comprises a first flip-flop connected to a first data source, a second flip-flop connected to a second data source, a differential multiplexer connected to the outputs of said flip-flops and a control interface receiving a select signal and connected to an enabling input of each flip-flop and to a control input of said differential multiplexer, the output of which is connected to said output modulator.

6. Device according to claim 5 wherein said control interface includes a fourth current mirror connected to a first negative voltage, fifth and sixth current mirrors each connected to a positive potential, a differential circuit controlled via a control transistor by said select signal and connected to an input of each of said fifth and sixth current mirrors, each of said fifth and sixth current mirrors has a first output connected to the enabling input of a flip-flop by an enabling transistor and also to the positive potential through a limiter circuit adapted to limit the amplitude of an enabling signal delivered by said enabling transistors, and each of said fifth and sixth current mirrors is connected directly to the control input of said multiplexer and also to a second negative voltage through a bias circuit.

7. Device according to claim 1 wherein said output modulator includes a differential output stage connected to said current generator and to ground and adapted to be connected to said laser, said differential stage has two control inputs each connected by a respective resistor to a respective transistor connected to the output of said selector circuit which delivers data to be transmitted, and each transistor is in series with a constant current source, the current source being connected to a second negative voltage and including a respective transistor in series with a respective resistor and fixed biased by a bias circuit.

8. Device according to claim 1 further comprising a transmit data copy circuit including a level adjust circuit adapted to receive another activation signal and an output circuit having an input connected to said selector circuit delivering the data to be transmitted and to said level adjust circuit, said output circuit copying said transmit data, and wherein said output circuit includes a first differential stage having an input connected to a selector circuit and an adapter stage connecting said first differential stag to first and second output transistors, said first differential stage is connected to a positive potential by a compensator circuit including means for compensating a voltage offset introduced by said adapter stage and for providing compensation for said adapter stage and said first and second output transistors and also to a first negative voltage through a first constant current source including a transistor fixed biased by a first bias circuit, said first and second output transistors are connected to said first negative voltage through respective second and third constant current sources, each of said second and third current sources including a transistor biased by a second bias circuit, and said first and second bias circuits are connected by an activation transistor to an output of said level adjust circuit which delivers a signal to activate said output circuit, and said first and second bias circuits being disabled in the absence of the signal delivered by said level adjust circuit and disabling said first, second and third constant current sources.

* * * * *